(12) United States Patent
Ko

(10) Patent No.: US 12,101,849 B2
(45) Date of Patent: Sep. 24, 2024

(54) METHOD AND SYSTEM FOR PROVIDING CONNECTED CAR SERVICE USING MOBILE NETWORKS OF DIFFERENT OPERATORS

(71) Applicants: Hyundai Motor Company, Seoul (KR); Kia Corporation, Seoul (KR)

(72) Inventor: Jaeyoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 424 days.

(21) Appl. No.: 17/667,506

(22) Filed: Feb. 8, 2022

(65) Prior Publication Data

US 2023/0062000 A1 Mar. 2, 2023

(30) Foreign Application Priority Data

Sep. 1, 2021 (KR) .......................... 10-2021-0116322

(51) Int. Cl.
| | |
|---|---|
| *H04W 8/18* | (2009.01) |
| *G07C 5/00* | (2006.01) |
| *H04L 67/00* | (2022.01) |
| *H04W 68/00* | (2009.01) |
| *H04W 76/18* | (2018.01) |
| *H04W 4/40* | (2018.01) |

(52) U.S. Cl.
CPC ............ *H04W 8/183* (2013.01); *G07C 5/006* (2013.01); *G07C 5/008* (2013.01); *H04L 67/34* (2013.01); *H04W 68/005* (2013.01); *H04W 76/18* (2018.02); *H04W 4/40* (2018.02)

(58) Field of Classification Search
CPC ....... H04W 8/183; H04W 8/18; H04W 76/18; H04W 48/18; H04W 12/72; H04W 68/005; H04W 4/40; G07C 5/006; G07C 5/008; H04L 67/34
See application file for complete search history.

(56) References Cited

U.S. PATENT DOCUMENTS

2005/0246080 A1\* 11/2005 Watkins ................... G07C 5/00
701/1
2013/0231087 A1\* 9/2013 O'Leary ............. H04W 12/084
455/411

\* cited by examiner

*Primary Examiner* — Keith Ferguson
(74) *Attorney, Agent, or Firm* — Slater Matsil, LLP

(57) ABSTRACT

A method of operating a vehicle terminal mounted on a connected car includes receiving, from a remote server, a vehicle state check request for changing a mobile network operator (MNO) which provides a communication network to be connected via a communication modem, checking a vehicle state according to the vehicle state check request and transmitting a vehicle state result determined based on the checked vehicle state to the remote server, receiving a request to change a subscriber profile of a first MNO set to the communication modem for a subscriber profile of a second MNO when the vehicle state result indicates that a subscriber profile update is possible, changing the communication modem with the subscriber profile of the second MNO, and accessing a communication network of the second MNO, and receiving a connected car service from the remote server via the communication network of the second MNO.

17 Claims, 4 Drawing Sheets

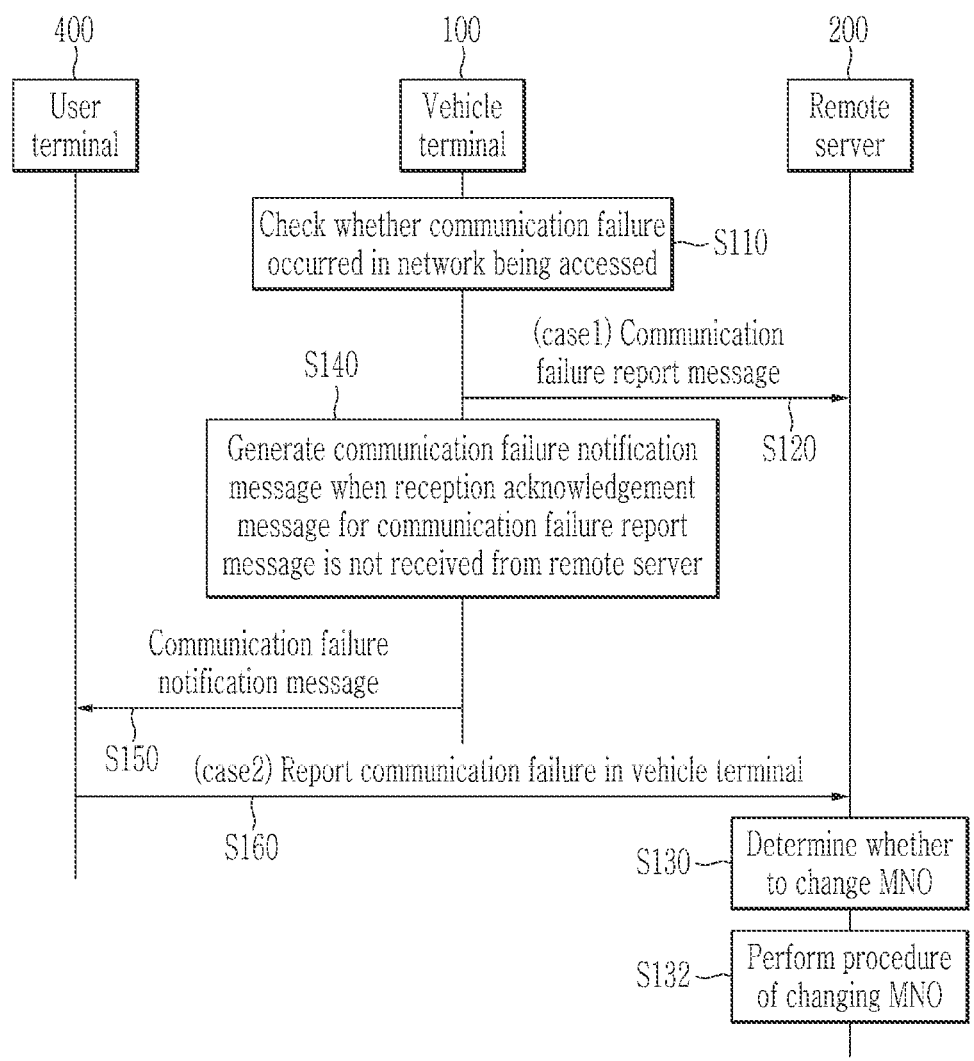

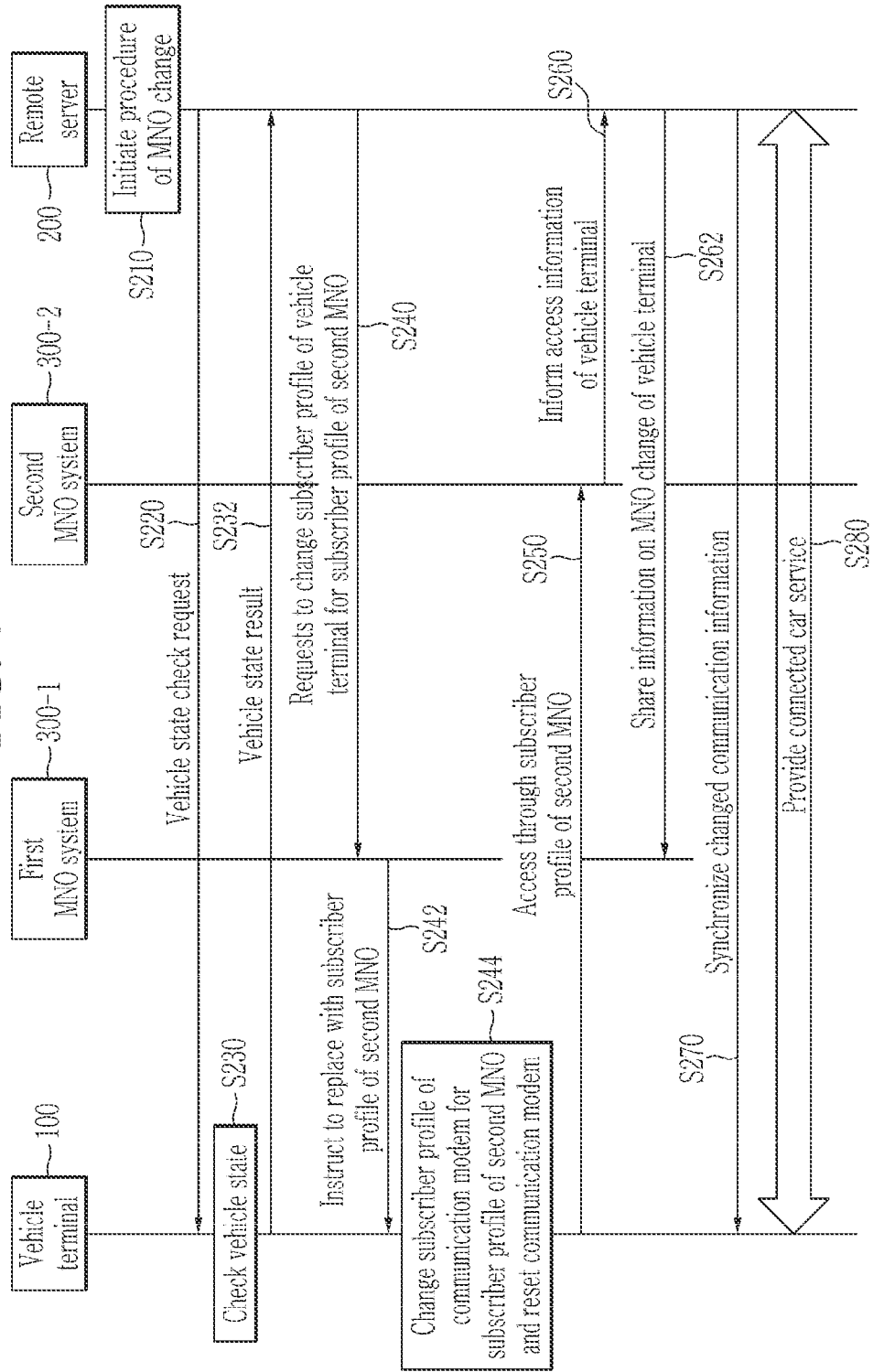

METHOD AND SYSTEM FOR PROVIDING CONNECTED CAR SERVICE USING MOBILE NETWORKS OF DIFFERENT OPERATORS

CROSS-REFERENCE TO RELATED APPLICATIONS

This application claims priority to and the benefit of Korean Patent Application No. 10-2021-0116322 filed in the Korean Intellectual Property Office on Sep. 1, 2021, the entire contents of which are incorporated herein by reference.

TECHNICAL FIELD

The present disclosure relates to a connected car service.

BACKGROUND

Recently, a connected car technology that performs mutual communication between external vehicles or with various infrastructure facilities besides receiving driving information such as traffic flow or weather information is being developed. A vehicle terminal can provide such a connected car service by transmitting and receiving various data after accessing a mobile communication network.

The vehicle terminal can access the mobile communication network via a universal integrated circuit card (UICC). The UICC includes subscriber information and mobile network operator (MNO) information, and the communication network allows network access after performing subscriber authentication with the information stored on the UICC.

The vehicle terminal uses an embedded universal integrated circuit card (eUICC) embedded so as not to be detachable, instead of a replaceable UICC which is detachable. Since the eUICC is released with being embedded in a terminal, the user cannot change the MNO by replacing the eUICC. In particular, if information cannot be received due to a network failure in a situation where the vehicle needs to acquire necessary information during driving via the communication network, it is highly possible to lead to a vehicle accident, thereby causing casualties. Therefore, the connected car service requires a technology capable of dealing with the communication failure.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure provides a method and system for providing a connected car service using communication networks of multiple mobile carriers.

The present disclosure provides a method for providing a connected car service. In the method, a subscriber profile set to a vehicle terminal is remotely changed for a subscriber profile of another MNO, and then a connected car service is provided via a network of the changed MNO.

According to an embodiment, a method of operating a vehicle terminal mounted on a connected car is provided. The method includes receiving, from a remote server, a vehicle state check request for changing a mobile network operator (MNO) which provides a communication network to be connected via a communication modem from a remote server, checking a vehicle state according to the vehicle state check request and transmitting a vehicle state result determined based on the checked vehicle state to the remote server, receiving a request to change a subscriber profile of a first MNO set to the communication modem for a subscriber profile of a second MNO when the vehicle state result indicates that a subscriber profile update is possible, changing the communication modem with the subscriber profile of the second MNO, and accessing a communication network of the second MNO, and receiving a connected car service from the remote server via the communication network of the second MNO.

The checked vehicle state may include at least one of a startup state of the connected car, whether the communication modem is available for communication connection, whether there is a software update in progress or scheduled software update, and a battery state of the connected car.

The vehicle state result may include information indicating whether a subscriber profile update is possible or impossible.

Receiving the vehicle state check request may include transmitting a communication failure report message to the remote server when a communication failure occurs during being connected to the communication network of the first MNO and then receiving the vehicle state check request from the remote server.

The communication failure report message may be transmitted as a short message.

Receiving the vehicle state check request may include transmitting, to a user terminal, a communication failure notification message requesting to report a communication failure to the remote server when a communication failure occurs during being connected to the network of the first MNO, and then receiving the vehicle state check request from the remote server.

Receiving the request to change for the subscriber profile the second MNO may include receiving, from the first MNO system, a request to replace with the subscriber profile of the second MNO, wherein the system of the first MNO receives a request to change the subscriber profile from the remote server.

Receiving the connected car service may include synchronizing changed communication information with the remote server to receive the connected car service.

According to another embodiment, a method of operating a remote server communicating with a vehicle terminal mounted on a connected car is provided. The method includes checking whether a communication failure occurred based on the communication failure report message upon receiving a communication failure report message from the vehicle terminal, determining whether to change a first mobile network operator (MNO) which provides a communication service to the vehicle terminal, requesting a vehicle state check for an MNO change to the vehicle terminal, receiving a vehicle state result determined based on vehicle state, and requesting the first MNO system to change a subscriber profile of the vehicle terminal for a subscriber profile of a second MNO when the vehicle state result indicate that a subscriber profile update is possible.

The method may include receiving a notification of an access of the vehicle terminal from the second MNO system, and providing a connected car service after synchronizing changed communication information with the vehicle terminal.

The vehicle state may include at least one of a startup state of the connected car, whether the communication modem is available for communication connection, whether there is a software update in progress or scheduled software update, and a battery state of the connected car.

According to the present disclosure, since a subscriber profile set to a vehicle terminal can be remotely replaced with a subscriber profile of another MNO, a communication service can be provided from various MNOs needless to change a communication modem and the MNO can be changed in real-time when required.

According to the present disclosure, even though a failure occurs in a communication network of an MNO which is being used, information required for driving and securing safety can be continuously provided to a vehicle terminal. As a result, a connected car service can be stably provided.

According to the present disclosure, it is possible to provide customers with a competitive mobile plan, thereby being able to activate a connected car service.

According to the present disclosure, since it is not required to replace a communication modem according to an MNO change, a cost of development/verification/certification can be reduced and also a cost required for verifying a connected car service caused by the MNO change can be reduced.

BRIEF DESCRIPTION OF THE DRAWINGS

FIG. 3 is a flowchart showing a method of changing an MNO due to an occurrence of a communication failure according to an embodiment.

FIG. 4 is a flowchart showing a method for changing an MNO according to an embodiment.

DETAILED DESCRIPTION OF ILLUSTRATIVE EMBODIMENTS

Figure 1:
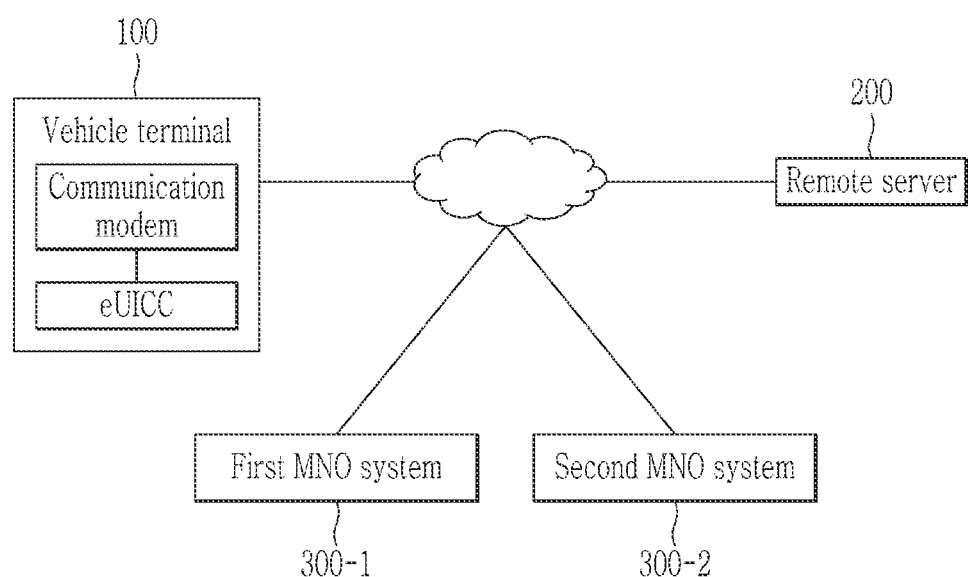
FIG. 1 is a configuration diagram of a system for providing a connected car service according to an embodiment.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the description, when a part is referred to "include" or "comprise" a certain component, it means that it may further include other components rather than exclude other elements, unless specifically indicates otherwise.

In the description, the terms such as " . . . unit", " . . . er/or", " . . . module", and the like refer to units that process at least one function or operation, which may be implemented with a hardware, a software or a combination thereof.

Various devices including a terminal and a server described in the present disclosure are composed of hardware including at least one processor, a memory device, a communication device, and the like, and a program which is executed in combination with the hardware is stored on a designated place. The hardware has a configuration and performance capable of executing the method of the present disclosure. The program includes instructions implementing an operation method of the present disclosure described with reference to the drawings, and executes the present disclosure in combination with hardware such as a processor and a memory device.

In this description, "transmission" or "provision" may include direct transmission or provision, as well as indirect transmission or provision through other devices or by way of bypass.

Expressions described in the singular in this specification may be interpreted as the singular or plural unless an explicit expression such as "one" or "single" is used.

In this description, the same reference numeral refers to the same component, and "and/or" means including each of the referred components and at least one of all combinations of the referred components.

In this description, terms including an ordinal number such as first and second may be used to describe various components, but the components are not limited by the terms. The terms are used only for the purpose of distinguishing one component from another. For example, a first component may be referred to as a second component without departing from the scope of the present disclosure, and similarly, a second component may also be referred to as a first component.

In the flowchart described with reference to drawings in this description, the operation order may be changed, several operations may be merged, certain operations may be divided, and specific operations may not be performed.

Here, a mobile network operator, abbreviated as MNO is a communication service provider that provides wireless voice and data communication for its subscribers. The MNO is also known as a mobile carrier, a carrier service provider, or mobile network carrier.

FIG. 1 is a configuration diagram of a system for providing a connected car service according to an embodiment.

As shown in FIG. 1, the system for providing a connected car service includes a vehicle terminal 100 equipped in a connected car and a remote server 200 that provides the connected car service through communicating with the vehicle terminal 100.

The vehicle terminal 100 accesses a communication network via a communication modem equipped therein, and transmits and receives data to and from the remote server 200. The network which the communication modem accesses may be determined by MNO information and subscriber information stored on an embedded universal integrated circuit card (eUICC). In the description, such network access information may be briefly referred to as a subscriber profile or a subscriber identity module (SIM) profile. The communication network is established by each MNO. The network of each MNO authenticates whether the vehicle terminal boo is a subscriber through the subscriber profile stored on the eUICC, and then allows network access. In the present disclosure, it can be described that the vehicle terminal 100 provides a connected car service to a vehicle/user through communicating with the remote server 200 providing the connected car service. Here, a separate connected car terminal providing the connected car service may be connected to the vehicle terminal 100 including a communication modem.

The vehicle terminal 100 may collect data generated in the connected car, transmit the collected data to the remote server 200, receive processed data from the remote server 200, and display the received data on a connected display. For example, when an airbag deployment accident occurs in the connected car, the vehicle terminal 100 may transmit information on the airbag deployment accident (e.g., time of accident, location of accident) to the remote server 200, and request a relevant safety service such as a SOS signal or e-CALL. Then, the remote server 200 may transmit corresponding information to a server of an institution performing accident management based on the received information, such as a medical institution or the police, and may lead the institution to perform a quick response. The above-described connected car service is just an example, and the connected car service is not limited to a certain service.

The remote server 200 is a server that is connected to the vehicle terminal 100 via a network and provides the connected car service. The remote server may collect, process, and provide information required for the connected car service.

The remote server 200 may manage basic information on the vehicle terminal 100, information of an MNO to which the vehicle terminal 100 is subscribed, a phone number of the vehicle terminal mo, a phone number of the MNO, and the like.

The vehicle terminal 100, the remote server 200, and various MNO systems, 300-1, 300-2, and 300-N may connect with each other, through which the vehicle terminal 100 may request the MNO change in use. Upon receiving a change result, the remote server 200 may synchronize changed communication information with the vehicle terminal 100 based on the change result. In the description, the MNO system is described with the same reference numeral. However, such description does not mean that the system connecting with the vehicle terminal 100 and the remote server 200 is the same device, but indicates that the system is an MNO-side device. Such system may be any one device among various devices actually constituting the communication network. In the description, the MNO that provides the communication network to subscribers may be simply referred to as a mobile carrier, a carrier service provider, or mobile network carrier.

Figure 2:
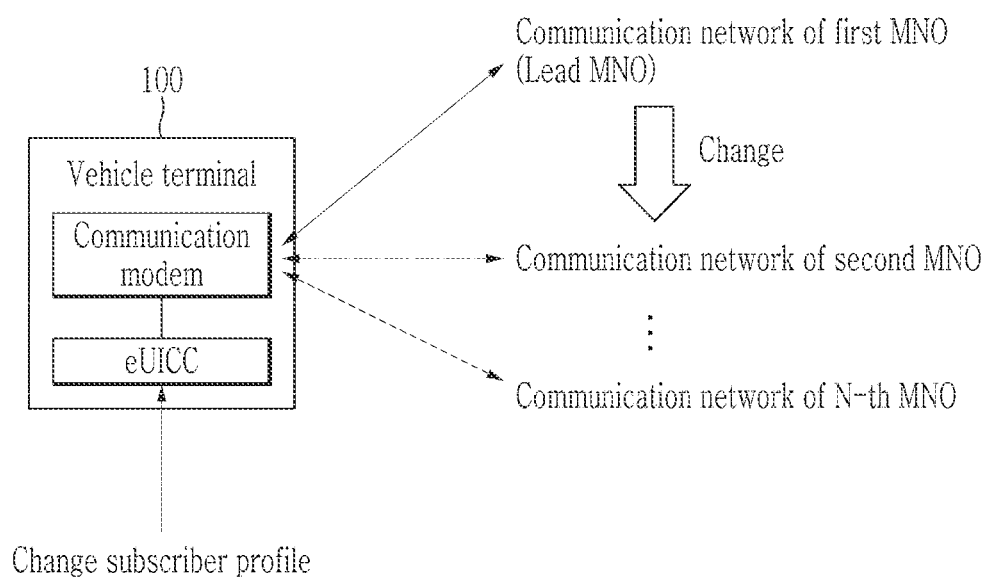
FIG. 2 is an exemplary diagram illustrating a communication connection method of a vehicle terminal according to an embodiment.

FIG. 2 is an exemplary diagram illustrating a communication connection method of a vehicle terminal according to an embodiment.

As shown in FIG. 2, a vehicle terminal 100 connects to a communication network via a communication modem. At this time, if the vehicle terminal 100 is authenticated in a communication network which the vehicle terminal 100 accessed using a subscriber profile (SIM profile) stored on an eUICC, the vehicle terminal 100 may be provided with a connected car service via the corresponding communication network. In addition, the vehicle terminal 100 may store access point name (APN) information for each MNO for network access. When the MNO is changed, the vehicle terminal 100 may access a communication network having an APN of the corresponding MNO. The vehicle terminal 100 may store an SMS number (PID/CID) for each MNO. It is assumed that the MNOs usable by the vehicle terminal 100 had been contracted in advance.

First, the vehicle terminal 100 may perform communication through accessing a communication network provided by a first MNO (lead MNO), being a main MNO.

Thereafter, when the subscriber profile stored on the eUICC is changed, the vehicle terminal 100 may access a communication network of a new MNO (e.g., a second MNO) corresponding to the changed subscriber profile. Here, a remote update of the subscriber profile may follow the 3rd generation partnership project (3GPP) standard.

Meanwhile, when a communication failure occurs in the vehicle terminal boo, the remote server 200 determines whether the vehicle terminal 100 can change the MNO and progresses a subscriber profile update when it is determined that the MNO can be changed.

After a new subscriber profile is updated between the communication modem and the communication network, information related to the communication modem is updated within the vehicle terminal 100. In addition, since a phone number and MNO information related to the vehicle terminal 100 and the connected car have been changed, the vehicle terminal boo or the remote server 200 may communicate with the vehicle terminal 100 and the connected car by using the changed information and may inform the server or the terminal of the changed information to enable a continuous service to be provided.

The change of the MNO may be performed when a failure occurs in the communication network to which the vehicle terminal 100 is connected or by the request from a user.

The vehicle terminal 100 determines whether a communication failure occurred in the communication network to which the vehicle terminal 100 is being connected. The vehicle terminal 100 may recognize an occurrence of the communication failure based on a failure code received when attempting to access the communication network. Here, the communication failure may be a data communication failure, and may include a data transmission failure, a data transmission delay, and the like.

When a communication failure occurs, the vehicle terminal 100 may transmit a communication failure report message to the remote server 200. The communication failure report message may be transmitted in the form of a short message based on a short message service (SMS). In addition, the vehicle terminal 100 may search for a stored SMS number of the MNO and transmit the communication failure report message to the searched SMS number. In addition, the vehicle terminal 100 may store the phone number of the user terminal and transmit the communication failure report message to the user terminal. When transmission of the communication failure report message to the remote server 200 was unsuccessful, the vehicle terminal boo may transmit a failure report notification message to the user terminal. The message transmitted from the vehicle terminal 100 may include different contents depending on the recipient.

The vehicle terminal 100 may be implemented as at least one computing device, and may execute a computer program including instructions described to perform an operation of the present disclosure.

Hardware of the vehicle terminal 100 may include at least one processor, a memory, a storage, and a communication modem, and may be connected via a bus. In addition, various components such as a register, a conductor, and a capacitor may be further included.

The processor is a device controlling operations of the computing device. The processor may be various types of processors that process instructions included in the computer program. For example, the processor may be a central processing unit (CPU), a microprocessor unit (MPU), a micro controller Unit (MCU), a graphic processing unit (GPU), and the like. In addition, the processor may perform an operation on the program for executing the above-described method.

The memory stores various data, instructions and/or information. The memory may load a corresponding computer program so that the instructions described to execute the operation of the present disclosure are processed by the processor. The memory may be, for example, a read only memory (ROM), a random access memory (RAM), and the like. The storage may store various data, the computer program, and the like required for executing the operation of the present disclosure. The storage may store the computer programs non-temporarily. The storage may be implemented with a non-volatile memory. The processor is connected to the network via a communication device.

The computer program includes instructions executed by a processor and is stored on a non-transitory computer readable storage medium. The instructions lead the processor to execute the operations of the present disclosure. The computer program may be downloaded via a network or sold as a product. In other words, a mode may be recognized based on a terminal connected through the computer program executed by the processor, and a function according to an input signal may be performed based on the recognized mode.

The communication modem is a wireless communication module with an embedded eUICC and may access a communication network. In addition, the communication modem may include a short-distance wireless communication module connecting with a terminal such as nearby smart phones, PCs, and tablets.

FIG. 3 is a flowchart showing a method of changing an MNO due to an occurrence of a communication failure according to an embodiment.

As shown in FIG. 3, a vehicle terminal 100 checks whether a communication failure occurred in a network being accessed (S110). The vehicle terminal 100 may determine that the communication failure has occurred, when a n-th communication connection attempt fails to make a communication connection. Here, the 'n' is a predetermined number of attempt times for determining the occurrence of communication failure. Alternatively, upon receiving a communication failure notification message, the vehicle terminal can identify that the communication failure has occurred during a specific period described in the notification message.

The vehicle terminal 100 transmits a communication failure report message to a remote server 200 (S120). The communication failure report message may be transmitted as a short message (SMS). When a communication failure is identified, the vehicle terminal 100 may search for a phone number of a report receiving office managed by the remote server 200 and may transmit the communication failure report message to the searched phone number. Here, the phone number of the remote server 200 may be a contact number of a customer center.

The remote server 200 checks whether a communication failure occurred based on the communication failure report message and determines whether to change an MNO of the vehicle terminal 100 (S130). At this time, the remote server 200 may identify the MNO being used by the vehicle terminal 100 based on the communication failure report message, transmit a failure confirmation request to an MNO system, and confirm the occurrence of the communication failure by receiving a result. Alternatively, the remote server 200 may determine that a communication failure has occurred when failure reports for a communication network of a certain carrier is greater than or equal to a threshold value. The remote server 200 may determine whether it is possible to change the MNO by checking states of communication networks of other MNOs.

The remote server 200 performs a procedure of changing MNO of the vehicle terminal 100 (S132). The remote server 200 may perform a procedure of changing a subscriber profile of the vehicle terminal 100 for a subscriber profile of another MNO by connecting with MNO systems. A communication channel through which the subscriber profile is transmitted to the vehicle terminal 100 is separated from a data channel providing the connected car service. Thus, the subscriber profile can be updated even though a data communication failure has occurred.

Meanwhile, if a reception acknowledgement message for the communication failure report message is not received from the remote server 200 within a predetermined time period, the vehicle terminal 100 assumes that the failure report has not been delivered and generates a communication failure notification message to be delivered to a user terminal (S140). In addition, the vehicle terminal 100 may display the communication failure notification message through a terminal interface such as a navigation equipped within the vehicle. Here, the communication failure notification message may include a phone number of a report receiving office managed by the remote server 200 along with notification contents that the service cannot be normally provided due to the communication failure. The communication failure notification message may include a dedicated URL for performing a failure report on a web page. Here, as described above, the phone number may be one or more of a dedicated number for receiving SMS messages only and a phone number allowing a connection to a customer service representative. Here, the dedicated URL has a specific failure report format, and includes checklist for selecting a changeable MNO in addition to failure report items.

The vehicle terminal 100 may transmit the communication failure notification message to the user terminal 400 (S150). The communication failure notification message may include notification contents that the service cannot be normally provided due to the communication failure and a request for communication failure report to the remote server 200. In addition, the communication failure notification message may display information on changeable MNOs to allow the user to select an MNO to be changed.

The user terminal 400 may report the communication failure in the vehicle terminal 100 to the remote server 200 (S160). Various reporting methods may be used. A user may send a text message to a call center system of the remote server 200 or report the communication failure via voice ARS/screen ARS. At this time, the user terminal 400 may transmit information on the MNO to be changed received from the user, while reporting the communication failure with a method provided by the remote server 200. Here, selection of an MNO to be changed is not essential, and the MNO may be temporarily changed when a failure occurs. In this case, the user may request a change of the MNO by selecting from the MNOs having contracted in advance.

Upon receiving the communication failure report from the user terminal 400, the remote server 200 may check whether the communication failure has occurred and perform a procedure of determining whether a change of the MNO is required, as in step S130.

FIG. 4 is a flowchart showing a method for changing an MNO according to an embodiment.

As shown in FIG. 4, a remote server 200 initiates a procedure of an MNO change for a vehicle terminal 100 (S210). It is assumed that the MNO for the vehicle terminal 100 is changed from a first MNO to a second MNO. A method for selecting the second MNO can be designed variously. The remote server 200 may select an MNO having a high priority among changeable MNOs, and also may select an MNO requested from the vehicle terminal 100 or the user terminal 400. The priority may be preset or an optimal MNO may vary at each time of change. In addition, the remote server 200 may check a communication state of a communication network of each MNO and select an MNO providing a robust communication network. On the other hand, when a user wants to change an MNO after subscribing to a specific mobile plan of the second MNO, the user may subscribe to the specific mobile plan by connecting to a second MNO system 300-2 via the user terminal 400. In this case, the second MNO system 300-2 may request the remote server 200 to change the MNO of the vehicle terminal 100.

The remote server 200 requests the vehicle terminal 100 to check a vehicle state (S220). The remote server 200 may determine whether the vehicle terminal 100 can change the MNO, and may perform a subscriber profile update when it is determined that the MNO can be changed. The vehicle state that needs to be checked may vary depending on a vehicle type or a procedure of changing the MNO. For example, the remote server 200 may request the vehicle terminal to check the vehicle state about a current startup state of the vehicle, whether a communication modem is available for communication connection, whether the vehicle terminal 100 is performing a software update, whether a software update is scheduled, vehicle battery state, and the like. For example, when a vehicle battery is discharged, it may be difficult to remotely update the subscriber profile. Thus, the remote server 200 may check the vehicle battery state before performing the procedure of changing the MNO.

The vehicle terminal 100 checks the requested vehicle state (S230), and transmits a vehicle state check result to the remote server 200 (S232). The vehicle terminal 100 may collect necessary vehicle information by connecting with various controllers such as a battery controller within the vehicle. The vehicle terminal 100 may determine whether each requested item is in a normal state, and may return the vehicle state result. Alternatively, the vehicle terminal 100 may return a confirmation value for each requested item. In the description, it is assumed that the vehicle terminal 100 checks the vehicle state and returns the vehicle state check result including information indicating update-possible (OK)/update-impossible (NOT OK) of the subscriber profile. For example, in order to provide a connected car service, the communication modem may be set to be supplied with power for a certain time period (e.g., 7 days=168 hours) after the startup is turned off. Therefore, if a certain amount of time is remained to reach 168 hours after vehicle startup is turned off, the power is being supplied to the communication modem. Thus, it can be determined that the vehicle is in a state where the subscriber profile update is possible. Meanwhile, even though the power is supplied to the communication modem, it may be difficult to properly perform the subscriber profile update while the subscriber profile update coincides with an update of other software. Therefore, if there is no scheduled software update or an update scheduled to start after the time required for subscriber profile update (e.g., 1 hr) is set, it can be determined that the subscriber profile update is possible. Oppositely, when the vehicle terminal 100 is not in a state where the subscriber profile can be updated, the vehicle terminal 100 may transmit an update-impossible signal to the remote server 200. In this case, the remote server 200 may return to step S220 after a predetermined time has passed and request to check the vehicle state.

When it is determined that the subscriber profile update is possible based on the received vehicle state result, the remote server 200 requests a first MNO system 300-1 to which the terminal vehicle 100 is connected to change the subscriber profile of the vehicle terminal 100 for a subscriber profile of the second MNO (S240). The first MNO system 300-1 instructs the vehicle terminal 100 to change for the subscriber profile of the second MNO (S242). The vehicle terminal 100 changes the subscriber profile of the communication modem for the subscriber profile of the second MNO and resets the communication modem (S244). The remote subscriber profile update may follow 3GPP specification.

The vehicle terminal 100 accesses a second MNO system 300-2 through the subscriber profile of the second MNO via the communication modem (S250). The vehicle terminal 100 may access a base station of the second MNO through the subscriber profile of the second MNO and an APN. Here, the APN of the second MNO may be stored on database in advance. The subscriber profile of the second MNO may also be stored in advance or received whenever the MNO is changed. After being connected to the second MNO system 300-2, the communication modem may perform wake-up of applications providing a connected car service and may provide information on the changed MNO and a changed phone number. The vehicle terminal 100 may extract information on the second MNO from the stored APN information and SMS number (PID/CID) for each MNO, and set the extracted information to the communication modem.

The second MNO system 300-2 informs the remote server 200 of the access from the vehicle terminal 100 (S260).

The remote server 200 stores information on MNO change of the vehicle terminal 100 and shares the information with the first MNO system 300-1 (S262). The first MNO system 300-1 stores the information on the MNO change of the vehicle terminal 100.

The remote server 200 providing the connected car service sets the changed communication information to the vehicle terminal 100 and synchronizes the changed communication information (S270). The vehicle terminal 100 may transmit a setting result to the remote server 200. Since the communication modem of the vehicle terminal 100 has been changed for the phone numbers of the new MNO and a new vehicle terminal 100, applications of the vehicle terminal 100 providing the connected car service may set necessary communication information. The synchronized communication information may include the changed MNO, a phone number corresponding to the changed subscriber profile, an SMS phone number of the changed MNO (a phone number of a report receiving office for SMS transmission), call center phone number of the changed MNO, and the like. The synchronized communication information may be transmitted via communication a network of the second MNO.

Thereafter, the vehicle terminal 100 may receive the connected car service from the remote server 200 via the network of the second MNO (S280).

According to the present disclosure, since a subscriber profile set to a vehicle terminal can be remotely replaced with a subscriber profile of another MNO, a communication service can be provided from various MNOs needless to change a communication modem and the MNO can be changed in real-time when required.

According to the present disclosure, even though a failure occurs in a communication network of an MNO which is being used, information required for driving and securing safety can be continuously provided to a vehicle terminal. As a result, a connected car service can be stably provided.

According to the present disclosure, it is possible to provide customers with a competitive mobile plan, thereby being able to activate a connected car service.

According to the present disclosure, since it is not required to replace a communication modem according to an MNO change, a cost of development/verification/certification can be reduced and also a cost required for verifying a connected car service caused by the MNO change can be reduced.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of operating a vehicle terminal mounted on a connected car, the method comprising:
receiving, from a remote server, a vehicle state check request for changing a mobile network operator (MNO) that provides a communication network to be connected via a communication modem;
checking a vehicle state according to the vehicle state check request and transmitting a vehicle state result determined based on the checked vehicle state to the remote server;
in response to the vehicle state result indicating that a subscriber profile update is possible, receiving a request to change a subscriber profile of a first MNO set to the communication modem for a subscriber profile of a second MNO;
changing the communication modem with the subscriber profile of the second MNO, and accessing a communication network of the second MNO; and
receiving a connected car service from the remote server via the communication network of the second MNO.

2. The method of claim 1, wherein the checked vehicle state comprises at least one of a startup state of the connected car, whether the communication modem is available for communication connection, whether there is a software update in progress or scheduled software update, or a battery state of the connected car.

3. The method of claim 1, wherein the vehicle state result comprises information indicating whether a subscriber profile update is possible or impossible.

4. The method of claim 1, wherein receiving the vehicle state check request comprises transmitting a communication failure report message to the remote server in response to a communication failure occurring during being connected to a communication network of the first MNO, and then receiving the vehicle state check request from the remote server.

5. The method of claim 4, wherein the communication failure report message is transmitted as a short message.

6. The method of claim 1, wherein receiving the vehicle state check request comprises:
transmitting, to a user terminal, a communication failure notification message requesting to report a communication failure to the remote server in response to the communication failure occurring during being connected to a communication network of the first MNO; and
then receiving the vehicle state check request from the remote server.

7. The method of claim 1, wherein receiving the request to change the subscriber profile of the second MNO comprises:
receiving, from a system of the first MNO, a request to replace with the subscriber profile of the second MNO, wherein the system of the first MNO receives a request to change the subscriber profile from the remote server.

8. The method of claim 1, wherein receiving the connected car service comprises:
synchronizing changed communication information with the remote server to receive the connected car service.

9. A method of operating a remote server communicating with a vehicle terminal mounted on a connected car, the method comprising:
upon receiving a communication failure report message from the vehicle terminal, checking whether a communication failure occurred based on the communication failure report message, and determining whether to change a first mobile network operator (MNO) that provides a communication service to the vehicle terminal;
requesting a vehicle state check for an MNO change to the vehicle terminal, and receiving a vehicle state result determined based on a vehicle state; and
in response to the vehicle state result indicating that a subscriber profile update is possible, requesting a system of the first MNO to change a subscriber profile of the vehicle terminal for a subscriber profile of a second MNO.

10. The method of claim 9, further comprising:
receiving a notification of an access of the vehicle terminal from a system of the second MNO; and
providing a connected car service after synchronizing changed communication information with the vehicle terminal.

11. The method of claim 9, wherein the vehicle state comprises at least one of a startup state of the connected car, whether a communication modem is available for communication connection, whether there is a software update in progress or scheduled software update, or a battery state of the connected car.

12. A vehicle terminal mounted on a connected car, the vehicle terminal comprising:
a communication modem;
a non-transitory memory storage comprising instructions; and
a processor in communication with the communication modem and the memory storage, wherein the processor is configured to execute the instructions to:
receive, from a remote server, a vehicle state check request for changing a mobile network operator (MNO) that provides a communication network to be connected via the communication modem;
check a vehicle state according to the vehicle state check request and transmitting a vehicle state result determined based on the checked vehicle state to the remote server;
in response to the vehicle state result indicating that a subscriber profile update is possible, receive a request to change a subscriber profile of a first MNO set to the communication modem for a subscriber profile of a second MNO;
change the communication modem with the subscriber profile of the second MNO, and access a communication network of the second MNO; and
receive a connected car service from the remote server via the communication network of the second MNO.

13. The vehicle terminal of claim 12, wherein the communication modem comprises an embedded universal integrated circuit card.

14. The vehicle terminal of claim 12, wherein the checked vehicle state comprises at least one of a startup state of the connected car, whether the communication modem is available for communication connection, whether there is a software update in progress or scheduled software update, or a battery state of the connected car.

15. The vehicle terminal of claim 12, wherein the vehicle state result comprises information indicating whether a subscriber profile update is possible or impossible.

16. The vehicle terminal of claim 12, wherein the instructions to receive the vehicle state check request comprise instructions to transmit a communication failure report message to the remote server in response to a communication failure occurring during being connected to a communication network of the first MNO, and receive the vehicle state check request from the remote server.

17. The vehicle terminal of claim 12, wherein the instructions to receive the vehicle state check request comprise instructions to:

transmit, to a user terminal, a communication failure notification message requesting to report a communication failure to the remote server in response to the communication failure occurring during being connected to a communication network of the first MNO; and receive the vehicle state check request from the remote server.

* * * * *